Sept. 17, 1968     S. D. POOL ET AL     3,401,512
RECIPROCATING MOWER HAVING IMPROVED CUTTING ACTION
Filed July 13, 1965
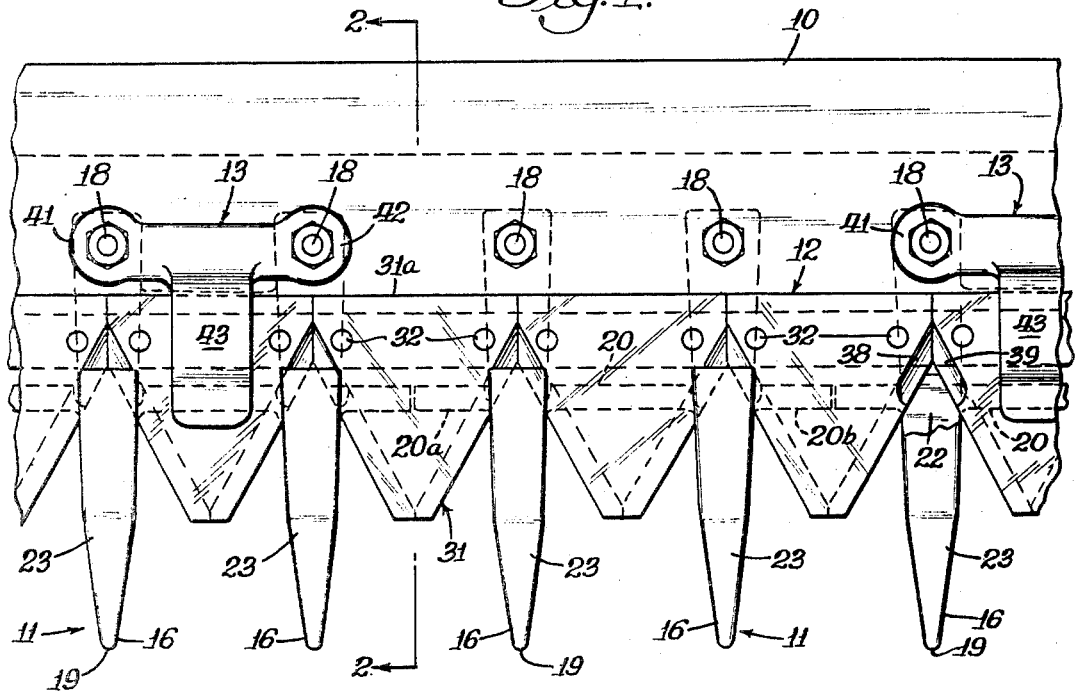
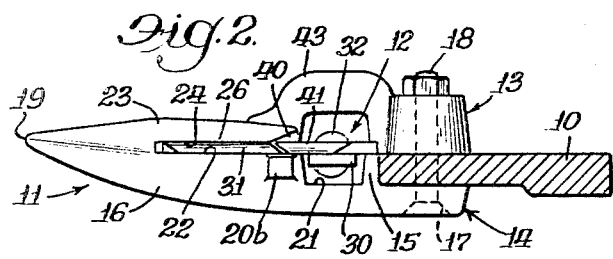
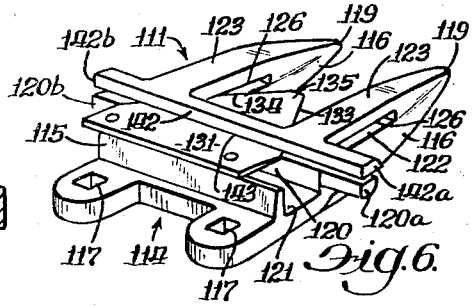
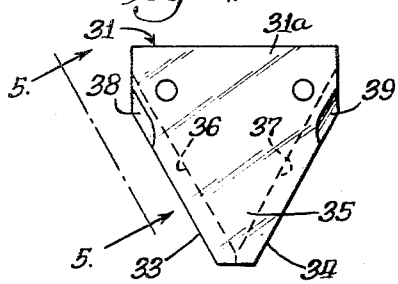
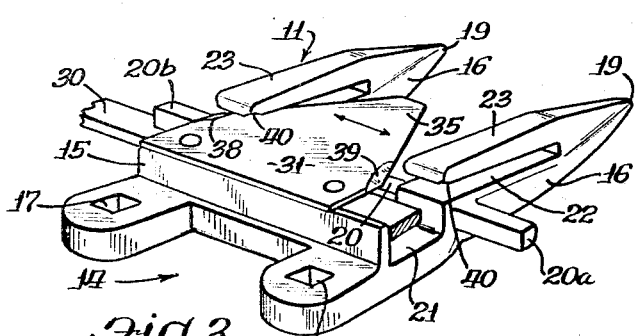
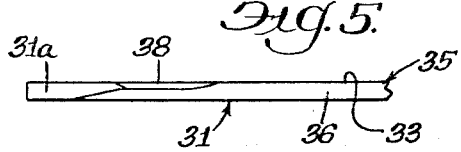
Inventors:
Stuart D. Pool
Edward Svereika
Orlie J. Thayer
By John J. Kowalik
Atty.

United States Patent Office 3,401,512
Patented Sept. 17, 1968

3,401,512
RECIPROCATING MOWER HAVING IMPROVED
CUTTING ACTION
Stuart D. Pool, Naperville, Edward Svereika, Chicago,
and Arlie J. Thayer, Brookfield, Ill., assignors to International Harvester Company, Chicago, Ill., a corporation of Delaware
Filed July 13, 1965, Ser. No. 471,536
8 Claims. (Cl. 56—298)

ABSTRACT OF THE DISCLOSURE

A knife section having upper and lower sides, forwardly converging edges and a rear mounting portion, one of the sides being beveled along said edges to provide cutting edges and the other side having bevels at opposite edges adjacent to said mounting portion providing guides as well as cutting edges.

---

This invention relates to mowing apparatus, and more particularly to mowing structure which is adapted to cut through rank growth and/or previously cut material.

In the past it has been well known to provide mowing apparatus with a reciprocally mounted cutter bar having a plurality of generally identical, somewhat triangularly shaped knife sections. Guard members have conventionally been provided for the knife sections, and usually also serve to guide the cutter bar during its reciprocating movement. In such apparatus, each knife section is provided with cutting edges at the forwardly converging sides thereof on one face of the knife section. During use of such a cutter bar, the cutting action has generated a force which tends to move the cutter bar upwardly out of its path of travel. Various types of hold-down means have been proposed in the past to obviate this problem, however, none of these expedients has been fully satisfactory.

In one well known construction, a plurality of laterally spaced guards are provided on a mounting member, and are positioned below the path of movement of the cutter bar to guide the cutter bar during its reciprocating movement. In this structure, it has been conventional to provide a plurality of hold-down clips on the mounting member above the path of travel of the cutter bar to resist the tendency of the cutter bar to move upwardly under the influence of the forces generated by the cutting action. The use of these hold-down clips has not been satisfactory, in that the cutter bar has exhibited a tendency to buckle between the clips, and the movement of the cutter bar relative to the clips has caused them to wear out after a short period of use.

A further expedient which has been proposed in the past is to provide rearwardly extending lip portions on the cuttter bar guide members which overlie the slot through which the cutter bar moves to resist upward movement of the cutter bar. This expedient has also proven unsatisfactory in that the upward forces generated by the cutting action have caused the knife sections of the cutter bar to interfere with the guard lip portions. It will be readily understood that this has caused undesirable wearing of the lip portion as well as of the knife sections themselves. Additionally, the relatively large amount of friction between the knife sections and the lip portions has increased the amount of power necessary to reciprocate the cutter bar.

Accordingly, the general purpose of the present invention is to provide a mower structure of the character described which obviates the problems noted above in connection with former constructions.

An object of the invention is to provide a mower apparatus wherein the primary cutting action takes place between mower guard lips overlying the path of movement of a cutter bar, and cutting edges at opposite sides of the cutter bar knife sections.

Another object of the invention is to provide a mower apparatus as described in the preceding paragraph with novel means for guiding the cutter bar thereof through the cutter bar slots of the mower guard members.

A further object of the invention is to provide novel knife sections for a mower cutter bar wherein each side of the knife sections has a cutting edge therealong and cutter bar guide means therebehind.

Still another object of the invention is to provide novel guide means on the lip portions of mower guard members to guide the cutter bar knife sections therepast.

These and other objects of the invention will hereinafter become more fully apparent from the following detailed description taken in connection with the annexed drawing, wherein:

FIG. 1 is a fragmentary plan view of a mower according to the present invention;

FIG. 2 is a sectional view taken generally along line 2—2 of FIG. 1;

FIG. 3 is a fragmentary perspective view of one embodiment of a mower guard with a knife section therein;

FIG. 4 is a plan view of a knife section;

FIG. 5 is an enlarged fragmentary view taken along line 5—5 of FIG. 4; and

FIG. 6 is a view similar to FIG. 5, on a slightly enlarged scale, showing a modified form of a mower guard.

Referring now to FIG. 1, the illustrated embodiment of the mower structure is shown to include a transversely extending mounting member 10. A plurality of laterally spaced mower guards 11 are secured to the mounting member 10, and a cutter bar assembly 12 is mounted for reciprocating movement relative to the member 10 and guards 11. A plurality of laterally spaced hold-down clips 13 may be provided on the mounting member 10, if desired, for a purpose to be hereafter described.

Each mower guard 11 includes a rear mounting portion 14 which is seated against the undersurface of mounting member 10, and an upwardly extending transverse flange 15 which bears against the front edge of mounting member 10 to position the mower guards 11 thereagainst. Each mower guard 11 is defined by a pair of generally identical fingers 16 which extend forwardly of mounting member 10 and the rearmost portion of each finger is provided with a countersunk hole 17 for reception of the head of a bolt 18 to secure the mower guards to the mounting member 10.

As can be best seen in FIGS. 1 and 2, the sides of each finger 16, and the top and bottom thereof converge forwardly to define a rounded leading portion 19 of reduced dimension. The finger portions 16 of each mower guard 11 are connected together by a transversely extending deflector member 20, which is suitably secured thereto. The outer portions 20a and 20b of member 20 extend laterally outwardly from the sides of fingers 16.

A transverse guideway is provided in each guard member 11, and is defined by a recess 21 in each finger 16 forwardly of flange 15. As is clear from FIG. 2, the cutter bar assembly 12 is mounted for reciprocating movement in the guideway defined by recesses 21.

A generally planar, horizontally disposed surface 22 is provided on the upper face of each finger 16 forwardly of recess 21, and defines a cutter bar seat thereon. Guards 11 further include a rearwardly extending lip portion 23 disposed in overlapping, overlying relationship with respect to finger surface 22. Lip portions 23 include a generally planar, horizontally disposed lower surface 24 parallel with surface 22, and defining therewith a cutter bar receiving slot. The sides of lip portions 23 converge upwardly to define longitudinally extending cutting edges 26 at opposite sides of surface 24.

The cutter bar assembly 12 includes a transversely extending support 30 which is mounted for reciprocating movement in the recesses 21 of the mower guards 11. A plurality of generally identical knife sections 31 (FIGS. 4 and 5) have their rear mounting portions 31a secured to support 30, as by rivets 32. Each knife section 31 includes a forward cutting portion 35 defined by forwardly converging sides 33 and 34. The sides 33 and 34 are beveled at 36 and 37 to define cutting edges at the junction between one face of the knife section and the sides 33 and 34. The knife section cutting edges 33 and 34 are disposed on the upper side of a plane through the center of the cutter bar assembly, and cooperate with cutting edges 26 on the lip portions 23 to effect a cutting action upon reciprocation of the support 30. It will be appreciated that the cutting action taking place at cutting edges 26 generates a downward force which is resisted by the fingers 16. Any upward forces imparted to the cutter bar 12, as by engagement with an obstruction, are resisted by lip portions 23 and by the hold-down members 13.

Hold-down members 13 are generally T-shaped in plan view (FIG. 1) and the arms 41 and 42 thereof may conveniently be secured to mounting member 10 by the guard mounting bolts 18. Hold-down members 13 include a forwardly extending portion 43 having a horizontally disposed undersurface which is positioned above the path of movement of the cutter bar assembly to resist any upward movement thereof. Since the force generated by the cutting action is substantially downwardly directed the hold-down members 13 may be eliminated, or the number which is used may be substantially reduced. A certain number of hold-down members may be desirable to resist upward forces on the cutter bar caused by obstructions.

Means are provided for guiding the knife sections 31 past the guard lip portions 23, and include beveled portions 38 and 39 in the upper surfaces of the knife sections at opposite sides thereof. As can be seen in FIGS. 4 and 5, beveled portions 38 and 39 are located at the rearward end of the cutting edges 33 and 34, respectively. From a consideration of FIG. 3 it will be apparent that beveled portions 38 and 39 are aligned with the innermost end of lip portions 23, and as the support 30 is reciprocated, the surfaces defined by beveled portions 38 and 39 will engage the lower side edges of the lip portions 23 to cam the knife sections downwardly, and effectively confine the knife sections for movement along the slots between surfaces 22 and 24. The corners of the lip portions may also be beveled or chamfered as at 40 to define further guide means for facilitating movement of the knife sections past the guard lip portions.

As is seen in FIG. 5 the beveled portions 38 and 39 do not extend from face to face of the knife sections 31; however, these beveled portions may extend from face to face of the knife sections, as seen at 41 in FIG. 2, if desired. Beveled portions 41 create cutting edges on the lower face of the knife sections, which cooperate with the guard finger portions to effect a cutting action.

Referring now to the embodiment of FIG. 6, similar reference numerals have been used to designate elements corresponding to those of the embodiments of FIGS. 1–5, and have been increased by the sum 100. The embodiment of FIG. 6 is similar to the embodiments of FIGS. 1–5 in that cutting edges 133 and 134 at opposite sides of knife sections 131 effect a cutting action with cutting edges 126 at opposite sides of lip portions 123 upon reciprocation of the cutter bar assembly. The means for guiding the knife sections past the guard lip portions includes transverse connecting bars 142 formed integrally with the lip portions of each mower guard at the rearward end thereof. The ends 142a and 142b of each connecting bar 142 extend outwardly from opposite sides of the lip portions 123 in general vertical alignment with deflector bar portions 120a and 120b. The lower surface of each connecting bar 142 is disposed in general coplanar relationship with the lower surfaces on the lip portions 123, so as to effectively confine the knife sections 131 for planar movement past the lip portions 123. The connecting bars 142 materially strengthen the mower guard lip portions, and obviate the need for providing lead in bevels or chamfers on the knife sections and/or the lip portions.

While we have shown and described one embodiment and modification of our invention, it is to be understood that it is capable of many modifications. Change, therefore, in the construction and arrangement may be made without departing from the spirit and scope of the invention as defined in the appended claims.

We claim:

1. A knife section comprising:
   a relatively thin member having opposite faces and a rear mounting portion;
   a cutting portion forwardly of said mounting portion and including forwardly converging sides;
   means defining a cutting edge at the junction of one of said faces and each of said sides; and
   combined guide and cutting means at the junction of the other of said faces and at least one of said sides.

2. A knife section comprising:
   a relatively thin member having opposite faces and a rear mounting portion;
   a cutting portion forwardly of said mounting portion and including forwardly converging sides;
   means defining a cutting edge at the junction of one of said faces and each of said sides at the forward end of said cutting portion; and
   combined guide and cutting means rearwardly of said cutting edges at the junction of the other of said faces and at least one of said sides.

3. A knife section as defined in claim 2 including further guide means rearwardly of said cutting edges at the junction of the other of said faces and the other of said sides.

4. A knife section comprising:
   a relatively thin member having opposite faces and a rear mounting portion;
   a cutting portion forwardly of said mounting portion and including forwardly converging sides;
   means defining a cutting edge at the junction of one of said faces and each of said sides; and
   means defining a beveled combination guide surface and cutting edge at the junction of the other of said faces and each of said sides.

5. A knife section comprising:
   a relatively thin member having opposite faces and a rear mounting portion;
   a cutting portion forwardly of said mounting portion and including forwardly converging sides;
   one of said faces being beveled adjacent the forward end of said sides to define cutting edges at the junction of the other of said faces and said sides; and
   the other of said faces being beveled adjacent the rearward end of said sides to define guide surfaces at the junction of said one face and said sides.

6. A mower assembly comprising:
   a mower guard including a rear mounting portion, a finger portion extending forwardly from said mounting portion and having an upper surface defining a cutter bar seat, a lip portion projecting rearwardly from the finger portion in overlapping overlying relation to the seat and defining therewith a cutter bar receiving slot, cutting edges on opposite sides of said lip; and
   a cutter bar mounted for movement in said slot, said cutter bar including a plurality of knife sections each having cutting edges at opposite sides of the upper surface thereof for providing a cutting action with the cutting edges on said lip upon movement of said cutter bar in said slot; and wherein beveled corners are provided at the rearward end of the lip portion for guiding said knife sections through said slot and cutting coaction with the guard.

7. A mower assembly comprising:

a mower guard including a rear mounting portion, a finger portion extending forwardly from said mounting portion and having an upper surface defining a cutter bar seat, a lip portion projecting rearwardly from the finger portion in overlapping overlying relation to the seat and defining therewith a cutter bar receiving slot, cutting edges on opposite sides of said lip; and a cutter bar mounted for movement in said slot, said cutter bar including a plurality of knife sections each having cutting edges at opposite sides of the upper surface thereof for providing a cutting action with the cutting edges on said lip upon movement of said cutter bar in said slot;

wherein beveled cutting edges are provided on opposite sides of the upper surface of each knife section to facilitate movement of said knife sections past said lip portion and cutting coaction with the guard.

8. A mower assembly comprising:

a mower guard including a rear mounting portion, a finger portion extending forwardly from said mounting portion and having an upper surface defining a cutter bar seat, a lip portion projecting rearwardly from the finger portion in overlapping overlying relation to the seat and defining therewith a cutter bar receiving slot, cutting edges on opposite sides of said lip;

a cutter bar mounted for movement in said slot, said cutter bar including a plurality of knife sections each having upper and lower faces and beveled cutting edges at opposite margins of the lower surface thereof for providing with the upper surfaces cutting edges for cutting action with the cutting edges on said lip upon movement of said cutter bar in said slot; and beveled portions in the upper surfaces of the knife sections at opposite margins thereof localized adjacent to the rear mounting portions thereof and providing means for guiding said knife sections through said slot.

References Cited

UNITED STATES PATENTS

| | | | |
|---|---|---|---|
| 601,447 | 3/1898 | Miller | 56—298 |
| 778,404 | 12/1904 | Cook | 56—298 |
| 2,234,783 | 3/1941 | Snow | 56—307 |
| 2,246,943 | 6/1941 | Jones | 56—298 |
| 3,284,994 | 11/1966 | Hamel | 56—298 |

ABRAHAM G. STONE, *Primary Examiner.*

P. RAZZANO, *Assistant Examiner.*